L. FLATAU.
COMBINED SEED-PLANTER, FERTILIZER-DISTRIBUTER, AND CULTIVATOR.
No. 184,516. Patented Nov. 21, 1876.
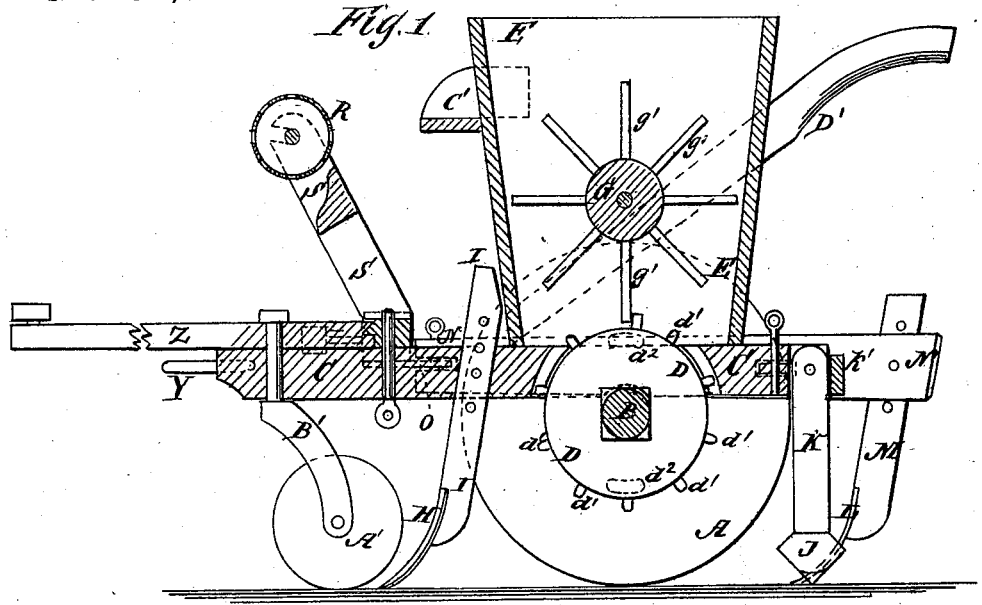
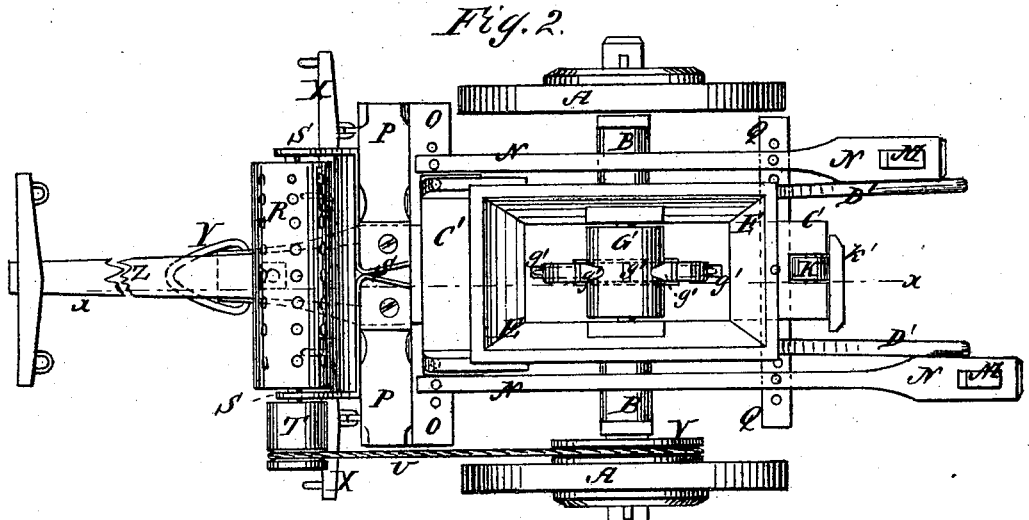
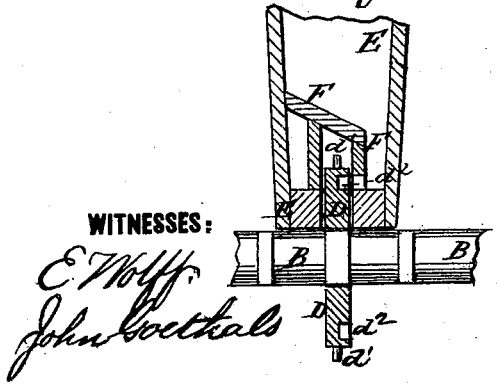
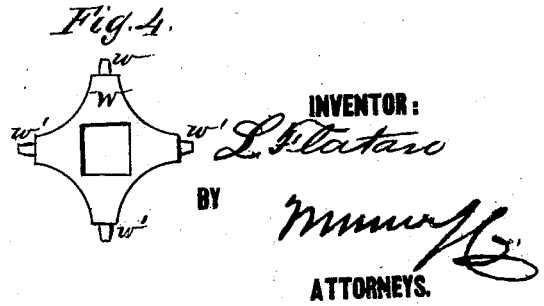
WITNESSES:
INVENTOR:
BY
ATTORNEYS.

UNITED STATES PATENT OFFICE.

LOUIS FLATAU, OF PITTSBURG, TEXAS.

IMPROVEMENT IN COMBINED SEED-PLANTER, FERTILIZER-DISTRIBUTER, AND CULTIVATOR.

Specification forming part of Letters Patent No. 184,516, dated November 21, 1876; application filed April 18, 1876.

*To all whom it may concern:*

Be it known that I, LOUIS FLATAU, of Pittsburg, in the county of Camp and State of Texas, have invented a new and useful Improvement in Combined Seed-Planter, Fertilizer-Distributer, and Cultivator, of which the following is a specification:

Figure 1 is a vertical longitudinal section of my improved machine, taken through the line $x\,x$, Fig. 2. Fig. 2 is a top view of the same. Fig. 3 is a detail cross-section of the hopper and dropping-wheel, arranged for dropping corn and pease. Fig. 4 is a detail view of the wheel for distributing fertilizers.

Similar letters of reference indicate corresponding parts.

The object of this invention is to furnish an improved machine which shall be so constructed that it may be readily adjusted for planting cotton, for planting corn and pease, for planting small seeds, for distributing fertilizers, or for cultivating plants, and which shall be effective and reliable in operation in either capacity.

The invention will first be described in connection with drawing, and then pointed out in the claims.

A are the wheels, which are rigidly attached to the axle B, so as to carry the said axle with them in their revolution. The axle B revolves in bearings attached to the central beam C. To the center of the axle B is attached the dropping-wheel D, which passes up through a slot in the beam C, and in the bottom of the hopper E, attached to said beam C. To the face of the wheel D are attached ten, more or less, cogs or prongs, $d^1$, to take hold of the cotton-seed and draw it out of the hopper E. In the side of the wheel D are formed one, two, or more pockets, $d^2$, to receive corn or pease from the hopper and drop them to the ground. When the machine is used for planting corn or pease, the part of the dropping-wheel D that projects into the hopper is covered with a case, F, the top of which is made inclined, and in the lower edge of its side, next the pockets $d^2$, is formed a notch to allow the kernels to pass into said pockets. To the sides of the hopper E is pivoted a shaft or hub, G, to which are attached prongs or cogs $g'$, of such a length that they may be struck and operated by the cogs $d^1$ of the dropping-wheel D. The device G is designed to keep the cotton-seed stirred up and fed down to the dropping-wheel D, so as to be carried out uniformly by said wheel D. The furrow is opened to receive the seed by a plow, H, the standard I of which passes up through a mortise in the central beam C, and is secured in place by a pin, several holes being formed in the said standard to receive the said pin, so that the plow may be adjusted to open a furrow of any desired depth. The seed is covered and the ridge smoothed off by the covering-block J, attached to the standard K, the upper end of which is hinged to the slotted rear end of the beam C, and which may be held down to its work, when desired, by a button, $k'$, pivoted to the rear end of the said beam C.

Instead of, or in connection with, the coverer J K, the plows L may be used, which are attached to the standards M. The standards M pass up through mortises in the beams N, and have a number of holes formed through them, to receive the pins by which they are secured in place adjustably. The beams N pass forward upon the opposite sides of the central beam C, and their forward ends are slotted longitudinally to receive the plates O, secured to the end parts of the cross-bar P, attached to the forward part of the beam C. The rear parts of the beams N are kept in place by the cross-bar Q, attached to the rear part of the beam C, which passes through mortises in said beams N, and upon which said beams N are secured in place by pins. Several holes are formed in the plates O and in the cross-bar Q, to receive the pins for securing the beams N, so that the said beams may be adjusted farther apart or closer together, as may be desired.

When small seeds are to be planted, they are placed in a hollow cylinder, R, the shell of which is perforated with numerous holes of such a size as to allow the seed to be planted. The journals of the cylinder R revolve in bearings in a frame or branched standard, S, attached to the cross-bar P. To one of the journals of the cylinder R is attached a pulley, T, around which passes a band, U. The band U also passes around a pulley, V, rigidly attached to the drive-wheel A, so that the cylinder R may be rotated to discharge the seed by the advance of the machine.

When a fertilizer is to be distributed with the small seeds, the dropping-wheel D is removed and replaced by the wheel W. The wheel W is provided with four arms or teeth, $w'$, which take hold of the fertilizer and draw it out, which operation is facilitated by recessing the wheel between the teeth $w'$, as shown in Fig. 4.

The draft may be applied to whiffletrees X, attached to the ends of the cross-bar P, or to a clevis, Y, attached to the end of the central beam C.

Z is the tongue, which is attached to the forward end of the beam C. The forward end of the machine may be supported by a caster-wheel, A', the standard B' of which is pivoted to the forward end of the beam C. A seat, C', for the driver may be attached to the forward part of the hopper E. D' are handles, which may be attached to the sides of the hopper E.

For ordinary use, the machine is drawn by two horses, either abreast or tandem. To adjust the machine to be drawn by one horse, the cross-bars P Q, the side beams N and their attachments, the caster-wheel A' B', and the tongue Z are removed, shafts being used or not, as may be desired.

Having thus described my invention, I claim as new and desire to secure by Letters Patent—

1. The dropping-wheel D, provided with the radial teeth $d^1$ upon its rim, and the pockets $d^2$ in its side, to adapt it for use in dropping cotton-seed or corn and pease, substantially as herein shown and described.

2. The combination of the case F with the dropping-wheel D $d^1$ $d^2$ and the hopper E, substantially as herein shown and described.

LOUIS FLATAU.

Witnesses:
THOMAS N. PITTS,
SAMUEL ARONSOHN.